D. EISINGA.
BOLTING-UP MACHINE.
APPLICATION FILED MAR. 13, 1919.

1,413,014.

Patented Apr. 18, 1922.

INVENTOR
Dirk Eisinga
BY
ATTORNEY

UNITED STATES PATENT OFFICE.

DIRK EISINGA, OF SEATTLE, WASHINGTON.

BOLTING-UP MACHINE.

1,413,014.               Specification of Letters Patent.      Patented Apr. 18, 1922.

Application filed March 13, 1919. Serial No. 282,297.

*To all whom it may concern:*

Be it known that I, DIRK EISINGA, a citizen of the United States of America, residing at Seattle, in the county of King and State of Washington, have invented a certain new and useful Bolting-Up Machine, of which the following is a specification.

My invention relates to the art of bolting-up devices.

In construction work embodying steel plates as in steel ships the plates after being hung or temporarily secured approximately in place must be forced tight together along their contacting edges and there bound fast and temporarily secured in preparation for their permanent fastening by riveting, or said plates must be brought tight up against a frame beam in preparation for their permanent securement thereto, these plates and frame beams having been prepared previously with rivet holes designed to register.

Often the plates are distorted and great force is requisite in bringing them together along their edges or tight against said frame beams. The common practice is to place bolts through the holes designed to register in the respective plates or plates and frame beams, and draw said parts together manually by wrenches by tightening a nut upon said bolt. Often it is necessary to use washers on said bolts when the plates are not widely separated, the providing of which washers and nuts of the right size consumes time and is costly as respects the element of labor. Obviously, the installation of a bolt in this manner requires two co-operating operators, namely, one, a holder-on, is necessary to hold said bolt, while a second operator, the bolter-up, applies the wrench to the nut.

For efficient operation, a machine designed to overcome said distortion and install said bolts or pins must be able, when occasion demands, to give sudden jerks to the bolt or pin, that is to operate in the manner of a ram, to develop the greater force to be derived from such mode of operation, and also said machine must be capable of exerting a steady pull of great force when such extreme force as just described is not necessary. Moreover, such a device must be light in weight and as small as possible so as to be able to be easily and effectively manipulated by the operator, who often must reach bolts or pins difficult of access, and at the same time be capable of developing the great forces above set forth. Such device must also be simple in construction so as not to get out of order and thus not require an operator of great mechanical skill.

These conditions indicate something of the range of requirements to be satisfied. Bolting-up pins for such temporary binding together of plates or frame beams and plates in preparation for the riveting, have been made the subject of a pending application for U. S. Letters Patent by me, Serial No. 252,147, bearing filing date of August 31, 1918. While my device as herein described is applied to a pin of the description set forth in said pending application, nevertheless the machine constituting the subject matter of this application may be easily adapted to be used with ordinary bolts, and this invention is by no means to be considered as limited to the form of pin described in the above identified application.

The subject of my present application relates to the mechanism which has as its object the facilitating of the drawing together of said plates or said plates and frame beams. Also, I purpose to provide a mechanism which will facilitate the drawing together of said plates or said plates and frame beams by acting upon the pin or bolt itself by gripping one end of said pin and pulling the same toward the machine while pressing the plate in the opposite direction. A further object is to provide a mechanism for the purposes set forth in which the force applied is transmitted to the piston provided with means to grip the bolting-up pin through the medium of a liquid, using no valves or auxiliary reservoirs therewith. Also, my purpose is to provide a bolting-up mechanism in which the force of the air pressure ordinarily available for pneumatic devices is multiplied many times by providing a plunger of relatively small pressure area compared to the air pressure area of the piston to which said plunger is attached, the plunger being so disposed that it bears upon a liquid by which the force is transmitted to a second piston and the liquid being so disposed that atmospheric pressure automatically causes the return of the liquid upon withdrawal of the plunger, in all of which no valves or auxiliary reservoirs are used. A further primary object of my invention is to provide a bolting-up mechanism which will also make fast upon the bolting-up pin the nut which serves to maintain the parts in tightly bound relation when said bolting-up machine is removed. In short, the object of my present invention is to provide a machine which will quickly and efficiently install bolting-up pins or bolts.

The above mentioned general objects of my invention, together with others inhering in the same, are attained by the mechanism illustrated in the following drawings, the same being merely a preferred exemplary form of embodiment of my invention, throughout which drawings like reference numerals indicate like parts:

Figures 1, 2, 3, 4, 5, 6:
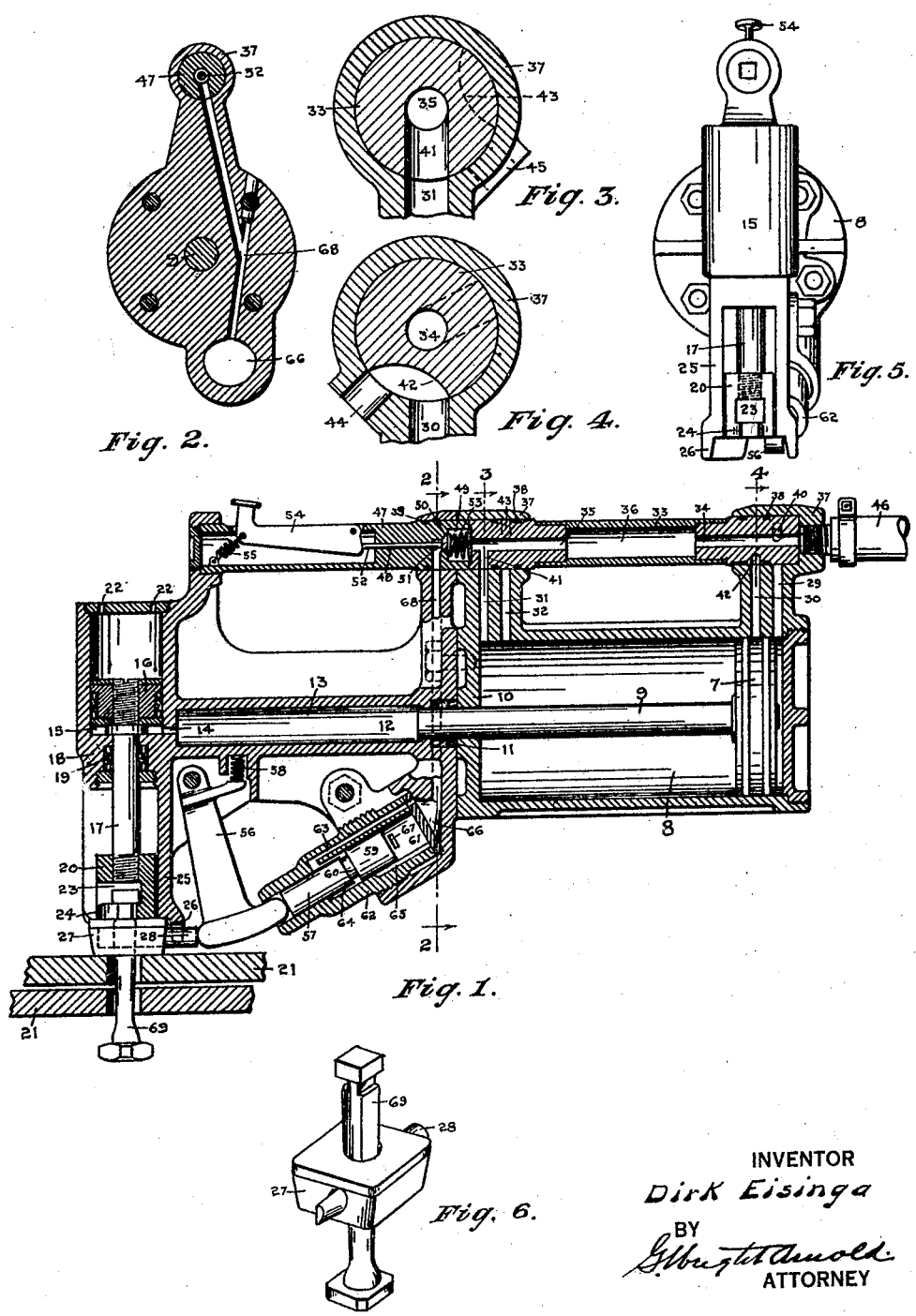
Figure 1, is a view in longitudinal section of a bolting-up machine embodying my invention, in applied position to a bolting-up pin.
Figure 2, is a view of the valve control member on broken line 2, 2.
Figure 3, is a view of the valve control member on broken line 3, 3.
Figure 4, is a view of the valve control member on broken line 4, 4.
Figure 5, is a front view in elevation of said machine embodying my invention.
Figure 6, is a view in perspective of a preferable form of bolting-up pin with associated nut and wedging pin to be used with my bolting-up machine herein set forth.

A piston 7 operating in cylinder 8 is provided with a plunger 9, disposed to move through the cylinder head 10 with packing rings 11 to operate upon the liquid 12 in cylinder 13. A vent 14 for said cylinder 13 allows said liquid to enter cylinder 15, which cylinder is provided with a piston 16, secured to a rod 17. This rod 17 operates through the cylinder head 18 with its packing rings 19, and the claw head 20 is fixed to the end of the rod 17 opposite the piston 16, which is thus designed to grip a bolting-up pin or bolt 69 inserted through plates 21. The cylinder 15 is provided with atmospheric ports 22.

The claw head 20 with its bolting-up pin head receiving recess 23 and flaring edges 24, is slidably mounted within the guide member 25, which has the shoulder 26 to embrace the nut 27, which nut is held firmly in place on any portion of the shank of the pin 69 as may be desired, by the wedging pin 28.

Cylinder 8 is provided with an inlet conduit 29 and an outlet conduit 30 in the back end of said cylinder, while the forward end is provided with a similar inlet conduit 31 and an outlet conduit 32. A cylindrical valve 33 with the axially disposed recesses 34 and 35 and the chamber 36 is rotatably mounted in the casing 37, having packing rings 38 to guard against the leakage of air. Packing ring 39 serves the same purpose between the casings 37 and 47. Recesses 34 and 35 have ports 40 and 41 respectively which may be caused to register with inlet conduits 29 and 31. The valve 33 is provided with concave recesses 42 and 43 which may be caused to serve as a connecting link between the outlet conduits 30 and 32 respectively and atmospheric ports 44 and 45. A flexible tube 46 establishes connection between the compressed fluid (such as air) tank and the recesses 34 and 35 and chamber 36. A casing 47 is provided with an axially positioned recess 48 opening into the enlarged chamber 49 with a check valve seat 50 for the valve head 51 integrally formed with a valve stem 52 fitting in said recess 48. A spring 53 holds the valve in closed position. A pivotally mounted trigger 54 is held by spring 55 in contact with said valve stem 52.

A pivotally mounted transmitter 56 serves to transmit the force of the hammer 57 against the wedging pin 28 as well as to change the direction of the blow of said hammer to a horizontal direction. A spring 58 maintains the said transmitter in contact with the pin 28. The hammer 57 is integrally formed with a piston 59 and a circular groove 60 is provided as a compressed fluid conduit. Said piston and hammer are operatively disposed in a cylinder 61. A cylinder casing 62 has a longitudinal duct 63 opening into the chamber 64 formed between the hammer 57 and the casing 62, by increasing the bore of this portion of the cylinder 61. A duct 65 lies in one side of the rear portion of the casing 62. A duct 63 communicates with chamber 66 formed in the rear of the cylinder casing 62. The rear portion of the cylinder 61 is provided with an atmospheric port 67. Chamber 66 communicates through the conduit 68, offset about the plunger 9 with the enlarged chamber 49.

The operation of my device is as follows: By way of preparation for the operator of the bolting-up machine herein set forth, bolting-up pins 69 are inserted through registering rivet holes in the plates 21. On said pins 69, a nut 27 with associated wedging pin 28 is placed, said nut gripping the pin shank just enough to maintain the bolting-up pin in place, no attempt being made to draw the plates together. With the pins thus positioned, the operator of the device herein described pushes the machine forward so that the head of the bolting-up pin enters the recess 23 of the claw head 20, the pin being guided by the flaring edges 24 of the claw head 20 which thus facilitates the application of the device to the pin. The bolting-up machine is shoved forward upon said pin 69 until the shoulder 26 of the back part of the claw head 20 bears against the nut 27. The valve 33 is then turned through a small arc, which causes the port 40 of the recess 34 to register with the inlet conduit 29, which permits the compressed fluid, such as air for example, to flow down the conduit 29 and bear upon the full rear area of the piston 7, thus actuating the piston forward with great force. When the valve 33 is turned to cause port 40 to register with the inlet conduit 29, it simultaneously causes the outlet conduit 32 to register with the valve recess 43 which communicates with port 45 leading to the atmosphere, so that there is not any air compression on the forward side of the piston 7 opposing the force of the compressed fluid or air on the back area of said piston, excepting such as serves as a cushion for the piston, thereby preventing it from injuriously striking against the end of the cylinder. The port 45, as well as the port 44, are directed downwardly and outwardly so as not to discharge the air against the operator. Thus piston 7 forces forward the plunger 9 forcing the liquid 12 in cylinder 13 through vent 14 and causes piston 16 to move upwardly pulling bolting-up pin 69 through the nut 27, which is held down by the guide member 25 on all sides but one. Manifestly, the force developed per square inch on the end of the plunger 9 is that of the air pressure on the piston 7 many times multiplied, since the air pressure area of said piston is many times larger than the end or pressure area of said plunger. The employment of a plunger of reduced end area acting upon a liquid without either valves or auxiliary reservoir is a most simple and efficient method of securing a multiplication of the force applied.

When the plates 21 are drawn tight together and are being so held, then the operator pushes down trigger 54 which unseats valve head 51 and permits the compressed air to flow from recess 35 through chamber 49 to the conduit 68, thence through chamber 66 to duct 63. A sufficient pressure area on the front of the piston 59, against which the compressed fluid can bear, is afforded by groove 60 to force the piston 59 and hammer 57 back. Clearly so soon as the piston reaches the duct 65 the compressed fluid rushes to the rear part of the cylinder back of the piston 59 and there the pressure area of the piston is so many times larger than on the front part of the piston that the hammer is forced forward suddenly delivering the sharp blow to the transmitter 56 but having been suddenly forced forward the hammer uncovers the atmospheric port 67 which destroys the pressure on the rear part of the piston 59 and then as the pressure is constant on the front portion of the piston, the hammer is forced back again, closing port 67, before the groove 60 registers with the duct 65. In this wise, a rapid vibratory action is given to the hammer 57 causing it to deliver rapidly a series of sudden blows to the transmitter 56 which drives home the wedging pin 28 in the nut 27, thus completing the temporary clamping of the plates in preparation for the riveter.

To force the piston 7 back the valve 33 is turned through a small arc so that port 41 is caused to register with the inlet conduit 31 (the position shown in the drawing) so that compressed air passes down the conduit 31 and bears against the forward face of the piston 7 driving the same back to initial position. Simultaneously with letting the compressed fluid pass to the inlet duct 31, the outlet duct 30 is caused to register with the valve recess 42 which communicates with the atmospheric port 44 so as not to permit a counter-pressure to be formed back of the piston 7, excepting such as will serve as a cushion to prevent the piston injuriously striking against the rear wall of the cylinder. Atmospheric pressure acting through ports 22 automatically forces piston 16 down thereby causing the liquid to flow back into cylinder 13.

Obviously, changes in the form, dimensions and arrangements of the parts of my invention may be made without departing from the scope of the claims, the above setting forth merely a preferred form of embodiment of my invention. Clearly, one way in which a bolting-up bolt of ordinary form could be used with my device to facilitate the clamping portion of the operation is this; a nut loosely screwed upon the top portion of the bolt would serve to permit the device constituting my invention to be applied to draw the plates together, while another bolt is firmly secured in position in an adjacent rivet hole.

I claim:

1. A bolting-up device for steel plates embodying a piston provided with means to grip one end of a bolting up pin, a guide member for said gripping means, a chamber wherein may be confined a liquid, liquid in said chamber, a port in said chamber permitting said liquid to communicate its pressure to said piston and means to subject said liquid to a high pressure.

2. A bolting-up device for steel plates embodying a piston, a piston rod secured to said piston, a claw head secured to said rod, a guide member for said claw head provided with a shoulder whereby a nut may be embraced by said shoulder and a downward pressure exerted upon said nut, a chamber wherein may be confined a liquid, liquid in said chamber, a port in said chamber permitting said liquid to communicate its pressure to said piston and means to subject said liquid to a high pressure.

3. A bolting-up device for steel plates embodying a piston provided with means to grip one end of a bolting up pin, a guide member for said gripping means, a chamber wherein may be confined a liquid, liquid in said chamber, a port in said chamber permitting said liquid to communicate its pressure to said piston, means to subject said liquid to a high pressure, a plunger disposed to act upon said liquid, a piston secured to said plunger, and compressed fluid means to actuate said plunger piston.

4. A bolting-up device for steel plates embodying a piston, a piston rod secured to said piston, a claw head secured to said rod, a guide member for said claw head provided with a shoulder whereby a nut may be embraced by said shoulder and a downward pressure exerted upon said nut, a chamber wherein may be confined a liquid, liquid in said chamber, a port in said chamber permitting said liquid to communicate its pressure to said piston, means to subject said liquid to a high pressure, a plunger disposed to act upon said liquid, a piston secured to said plunger, and compressed fluid means to actuate said plunger piston.

5. A bolting-up device for steel plates embodying a piston provided with means to grip one end of a bolting up pin, a guide member for said gripping means, a chamber wherein may be confined a liquid, liquid in said chamber, a port in said chamber permitting said liquid to communicate its pressure to said piston, means to subject said liquid to a high pressure, a plunger disposed to act upon said liquid, a piston secured to said plunger, compressed fluid means to actuate said plunger piston, and a pneumatic hammer, said compressed fluid means actuating said hammer while holding the said plates in close relation.

6. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, and a pneumatic hammer disposed to act upon said wedging pin, said hammer being actuated by said fluid means while holding the said plates in close relation.

7. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter, and a pneumatic hammer disposed to act upon said transmitter, said hammer being actuated by said fluid means while holding the said plates in close relation.

8. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter normally bearing against said wedging pin, and a pneumatic hammer normally resting against said transmitter when placed in operating position, said hammer being actuated by said fluid means while holding the said plates in close relation.

9. A bolting-up device for steel plates embodying a cylinder, atmospheric ports in said chamber, a piston mounted in said chamber subject to atmospheric pressure through said ports, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter, and a pneumatic hammer disposed to act upon said transmitter, said hammer being actuated by said fluid means while holding the said plates in close relation.

10. A bolting-up device for steel plates embodying a piston provided with means to grip one end of a bolting up pin, a guide member for said gripping means disposed to bear downwardly upon the steel plates, a chamber wherein may be confined a liquid, liquid in said chamber, a port in said chamber permitting said liquid to communicate its pressure to said piston, means to subject said liquid to a high pressure, a plunger disposed to act upon said liquid, a piston secured to said plunger, compressed fluid means to actuate said plunger piston, a pneumatic hammer, said compressed fluid means actuating said hammer while holding the said plates in close relation, a valve whereby said compressed fluid means is controlled and a trigger means whereby the flow of said compressed fluid means from said valve to said pneumatic hammer is controlled.

11. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a pneumatic hammer disposed to act upon said wedging pin, said hammer being actuated by said fluid means while holding the said plates in close relation, a valve whereby said compressed fluid means is controlled and a trigger means whereby the flow of said compressed fluid means from said valve to said pneumatic hammer is controlled.

12. A bolting-up device embodying a piston provided with means to grip an end of a bolting-up pin, a second piston, a plunger carried by said second piston having a relatively smaller pressure area than said second piston, liquid disposed to receive the thrust of said plunger and transmit the force to the first plunger.

13. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter, a pneumatic hammer disposed to act upon said transmitter, said hammer being actuated by said fluid means while holding the said plates in close relation, a valve whereby said compressed fluid means is controlled, and a trigger means whereby the flow of said compressed fluid means from said valve to said pneumatic hammer is controlled.

14. A bolting-up device for steel plates embodying a piston, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter normally bearing against said wedging pin, a pneumatic hammer normally resting against said transmitter when placed in operating position, said hammer being actuated by said fluid means while holding the said plates in close relation, a valve whereby said compressed fluid means is controlled, and a trigger means whereby the flow of said compressed fluid means from said valve to said pneumatic hammer is controlled.

15. A bolting-up device for steel plates embodying a cylinder, atmospheric ports in said chamber, a piston mounted in said chamber subject to atmospheric pressure through said ports, a piston rod secured to said piston, a claw head secured to said rod, a bolting up pin, a nut for said pin, a wedging pin for said nut, a guide member for said claw head provided with a shoulder disposed to embrace said nut, a chamber wherein may be confined a liquid, liquid in said chamber, a port in said chamber permitting said liquid to communicate its pressure to said piston, a plunger disposed to act upon said liquid, a piston secured to said plunger, compressed fluid means to actuate said plunger piston, a transmitter, a pneumatic hammer disposed to act upon said transmitter, said hammer being actuated by said fluid means while holding the said plates in close relation, a valve whereby said compressed fluid means is controlled and a trigger means whereby the flow of said compressed fluid means from said valve to said pneumatic hammer is controlled.

16. A bolting-up device embodying a piston provided with means to grip one end of a bolting-up pin, a nut for said pin, a guide member for said gripping means disposed to bear downwardly upon said nut, and means to actuate said piston.

In witness whereof I hereunto subscribe my name this 6th day of March, A. D. 1919.

DIRK EISINGA.